United States Patent
Nishii et al.

(10) Patent No.: US 7,121,086 B2
(45) Date of Patent: Oct. 17, 2006

(54) DESULPHATING OF NITROGEN OXIDE TRAPPING CATALYST

(75) Inventors: Satoshi Nishii, Yokohama (JP); Kenichi Sato, Yokohama (JP); Yasuji Ishizuka, West Bloomfield, MI (US)

(73) Assignee: Nissan Motor Co., Ltd., Yokohama (JP)

(*) Notice: Subject to any disclaimer, the term of this patent is extended or adjusted under 35 U.S.C. 154(b) by 563 days.

(21) Appl. No.: 10/162,218

(22) Filed: Jun. 5, 2002

(65) Prior Publication Data
US 2002/0192125 A1    Dec. 19, 2002

(30) Foreign Application Priority Data
Jun. 8, 2001    (JP)    ............... 2001-174365

(51) Int. Cl.
*F01N 3/00*    (2006.01)
(52) U.S. Cl. ............... 60/295; 60/274; 60/276; 60/278; 60/285; 60/301
(58) Field of Classification Search ............... 60/277, 60/285, 295, 301, 274, 276, 278
See application file for complete search history.

(56) References Cited

U.S. PATENT DOCUMENTS

| | | | |
|---|---|---|---|
| 5,657,625 A * | 8/1997 | Koga et al. ............... 60/274 |
| 6,199,374 B1 * | 3/2001 | Hirota et al. ............... 60/277 |
| 6,233,923 B1 * | 5/2001 | Itou et al. ............... 60/277 |
| 6,237,330 B1 * | 5/2001 | Takahashi et al. ............ 60/285 |
| 6,336,320 B1 * | 1/2002 | Tanaka et al. ............... 60/285 |
| 6,341,487 B1 * | 1/2002 | Takahashi et al. ............ 60/286 |
| 6,378,298 B1 * | 4/2002 | Harima et al. ............... 60/274 |
| 6,901,749 B1 | 6/2005 | Hashimoto |

FOREIGN PATENT DOCUMENTS

| | | |
|---|---|---|
| DE | 100 23 793 A1 | 1/2002 |
| DE | 101 02 132 A1 | 7/2002 |
| EP | 1 059 428 A2 | 12/2000 |
| EP | 1 500 800 A1 | 1/2005 |
| JP | 9-317447 A | 12/1997 |
| JP | 2000-73744 | 3/2000 |
| JP | 2000-204930 A | 7/2000 |
| JP | 2000-234512 A | 8/2000 |
| JP | 2000-265885 A | 9/2000 |

* cited by examiner

*Primary Examiner*—Thomas Denion
*Assistant Examiner*—Diem Tran
(74) *Attorney, Agent, or Firm*—Foley & Lardner LLP

(57) ABSTRACT

Sulphur oxides in the exhaust gas of a vehicle engine (1) are trapped by a nitrogen oxide trapping catalyst (5A). A controller (6) calculates the sulphur oxide poisoning amount of the trapping catalyst (5A) from the running condition of the vehicle (S13), and desulphating the sulphur oxides by a removing mechanism (3, 4, 14). The release amount of sulphur oxides per unit time due to desulphating is set as a parameter based on the sulphur oxide poisoning amount (S11), and by integrating the calculated release amount using the parameter, the current poisoning amount is calculated, and the release completion timing is precisely found.

13 Claims, 5 Drawing Sheets

DESULPHATING OF NITROGEN OXIDE TRAPPING CATALYST

FIELD OF THE INVENTION

This invention relates to desulphating of a nitrogen oxide (NOx) trapping catalyst for an internal combustion engine.

BACKGROUND OF THE INVENTION

Tokkai 2000-73744 published by the Japanese Patent Office in 2000 discloses an exhaust purification device provided with a trapping catalyst which prevents nitrogen oxides (NOx) contained in the exhaust gas from being released into the atmosphere, when running the internal combustion engine at a lean air-fuel ratio.

The NOx trapping catalyst traps NOx contained in the exhaust gas of the engine when it is run at a lean air-fuel ratio, and releases the trapped NOx when the engine is run at a rich air-fuel ratio. The NOx released by the catalyst is reduced by reducing agents in the exhaust gas such as hydrocarbons (HC) and carbon monoxide (CO) that are generated due to combustion of a fuel mixture of a rich air-fuel ratio, and is discharged into the atmosphere as nitrogen ($N_2$).

When the NOx trapping catalyst traps the NOx in the exhaust gas at a lean air-fuel ratio, it also traps sulfur oxides (SOx) in the exhaust gas. The sulfur oxides poisons the catalyst, and the NOx trapping performance declines the more the poisoning by SOx increases.

In the prior art device, the trapped amount of SOx by the catalyst is computed, and when the computed amount reaches an upper limit, the air-fuel ratio of the air-fuel mixture supplied to engine is temporarily enriched and the exhaust gas temperature is increased. Due to the increase of temperature of the exhaust gas, the SOx trapped by the NOx trapping catalyst is released, and the NOx trapping performance of the NOx trapping catalyst is recovered. This operation is termed desulphating of the NOx trapping catalyst.

SUMMARY OF THE INVENTION

In the prior art device, the SOx release amount during desulphating of the NOx trapping catalyst is calculated based on the assumption that the SOx amount is released from the NOx trapping catalyst at a fixed rate. Desulphating is performed until the trapped SOx amount decreases to a predetermined lower limiting value.

However, the inventors discovered experimentally that the SOx release rate was not fixed, and differed according to the trapped amount. Therefore, if the SOx release amount of the NOx trapping catalyst is calculated by setting the SOx release rate constant, gross errors will arise in the calculation result and the desulphating of the NOx trapping catalyst will not be performed correctly. Unless desulphating is performed correctly, the NOx trapping performance of the NOx trapping catalyst will not necessarily be recovered as desired. Moreover, as desulphating is accompanied by an enriching of the air-fuel ratio, desulphating of low precision brings about an increase of engine fuel consumption.

It is therefore an object of this invention to calculate the SOx release amount during desulphating of a NOx trapping catalyst, correctly.

In order to achieve the above object, this invention provides an exhaust gas purification device for a vehicle engine. The device comprises a nitrogen oxide trapping catalyst which traps nitrogen oxides in exhaust gas and the engine comprises a mechanism which removes sulphur oxides which have poisoned the nitrogen oxide trapping catalyst from the nitrogen oxide trapping catalyst.

The device further comprises a sensor which detects a running condition of the vehicle, and a programmable controller programmed to calculate a sulphur oxide poisoning amount of the nitrogen oxide trapping catalyst from the running condition of the vehicle, start operation of the mechanism when the sulphur oxide poisoning amount reaches a predetermined amount, set a decrease amount per unit time of the sulphur oxide poisoning amount during operation of the mechanism as a parameter based on the sulphur oxide poisoning amount, calculate the sulphur oxide poisoning amount during operation of the mechanism based on an integral value of the decrease amount per unit time, and after operation of the mechanism has started, stop operation of the mechanism when the sulphur oxide poisoning amount has decreased to a predetermined desulphating completion equivalent value.

This invention also provides an exhaust gas purification method for such a vehicle engine that comprises a nitrogen oxide trapping catalyst which traps nitrogen oxides in exhaust gas, a mechanism for removing sulphur oxides which have poisoned the nitrogen oxide trapping catalyst from the nitrogen oxide trapping catalyst.

The method comprises detecting a running condition of the vehicle, calculating a sulphur oxide poisoning amount of the nitrogen oxide trapping catalyst from the running condition of the vehicle, starting operation of the removing mechanism when the sulphur oxide poisoning amount reaches a predetermined amount, setting a decrease amount per unit time of the sulphur oxide poisoning amount during operation of the removing mechanism as a parameter based on the sulphur oxide poisoning amount, calculating the sulphur oxide poisoning amount during operation of the removing mechanism based on an integral value of the decrease amount per unit time, and stopping, after operation of the removing mechanism has started, operation of the removing mechanism when the sulphur oxide poisoning amount has decreased to a predetermined desulphating completion equivalent value.

The details as well as other features and advantages of this invention are set forth in the remainder of the specification and are shown in the accompanying drawings.

DESCRIPTION OF THE PREFERRED EMBODIMENTS

Figure 1:
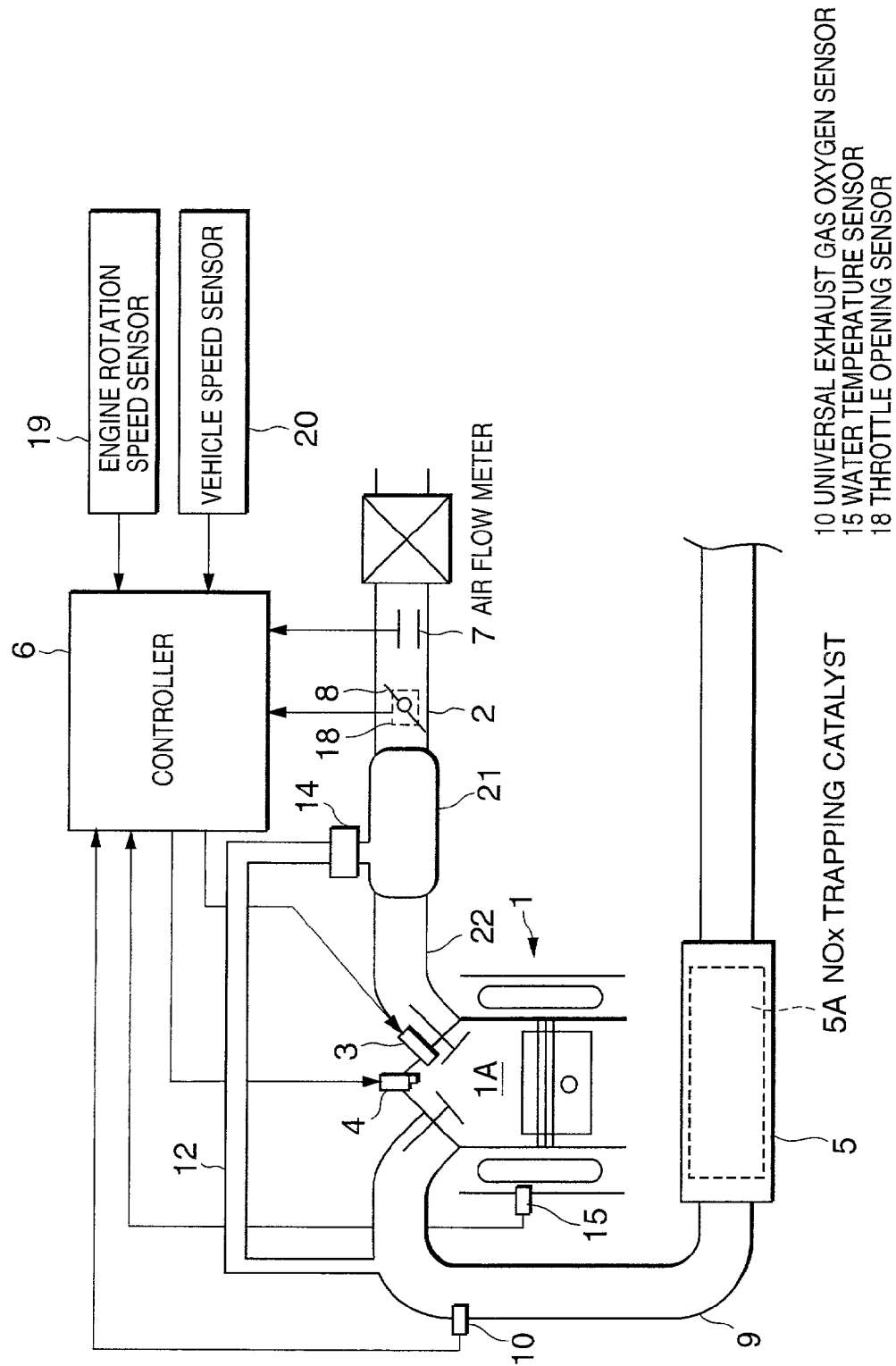
FIG. 1 is a schematic diagram of an internal combustion engine provided with an exhaust purification device according to this invention.

Referring to FIG. 1 of the drawings, a multi-cylinder four-stroke cycle direct injection gasoline engine 1 for a vehicle comprises an intake passage 2 which aspirates air to a combustion chamber 1A formed in each cylinder, and an exhaust passage 9 which discharges the exhaust gas from the combustion chamber 1A.

The intake passage 2 is connected to the combustion chamber 1A via a collector 21 and intake manifold 22. An air flow meter 7 which detects the intake air amount, and a throttle 8 which regulates the intake air amount, are provided in the intake passage 2. A fuel injector 3 injects fuel into the air aspirated into the combustion chamber 1A and generates an air-fuel mixture. The air-fuel mixture burns due to a spark plug 4 provided in the combustion chamber 1A which ignites the air-fuel mixture.

The exhaust gas due to combustion of the air-fuel mixture is discharged into the atmosphere via a catalytic converter 5 disposed midway along the exhaust passage 9. Part of the exhaust gas is returned to the intake air through an exhaust gas recirculation (EGR) passage 12 which connects the collector 21 with the exhaust passage 9. The EGR passage 12 is provided with an EGR valve 14 which regulates the exhaust gas recirculation amount.

The nitrogen oxide (NOx) contained in the exhaust gas of the air-fuel mixture having a lean air-fuel ratio is trapped by a NOx trapping catalyst 5A contained in the catalytic converter 5. The NOx trapping catalyst 5A releases the trapped NOx and promotes the reduction thereof when it meets the exhaust gas generated from an air-fuel mixture having a rich air-fuel ratio. A controller 6 controls the fuel injection timing and injection period of the fuel injector 3, ignition timing of the spark plug 4, and the opening of the EGR valve 14 by signals.

The controller 6 comprises a microcomputer provided with a central processing unit (CPU), a read-only memory (ROM), a random access memory (RAM) and an input/output interface (I/O interface). The controller 6 may also comprise plural microcomputers.

For this control, signals are input to the controller 6 from a throttle opening sensor 18 which detects the opening of the throttle 8, an engine rotation sensor 19 which detects a rotation speed of the engine 1, a vehicle speed sensor 20 which detects a running speed of the vehicle, a water temperature sensor 15 which detects a cooling water temperature of the engine 1, and a universal exhaust gas oxygen sensor 10 which detects the air-fuel ratio of the air-fuel mixture burnt by the engine 1 from the exhaust gas composition of the exhaust passage 2, respectively.

In the steady state of the engine 1, by controlling the fuel injection amount of the fuel injector 3, the controller 6 burns an air-fuel mixture having a lean air-fuel ratio with less fuel than the stoichiometric air-fuel ratio. The NOx trapping catalyst of the catalytic converter 5 traps the NOx contained in the exhaust gas of the engine 1 in this state. On the other hand, if the NOx trapping catalyst traps a predetermined amount of NOx, by controlling the fuel injection amount of the fuel injector 3, the controller 6 burns an air-fuel mixture having a rich air-fuel ratio with more fuel than the stoichiometric air-fuel ratio, and regenerates the NOx trapping catalyst by releasing the NOx trapped by the NOx trapping catalyst and reducing NOx by HC and CO, which are reducing agents contained in exhaust gas generated under a rich air-fuel ratio.

Apart from the NOx trapping and regeneration of this catalyst, the controller 6 calculates a SOx cumulative amount of the NOx trapping catalyst in the catalytic converter 5. The SOx cumulative amount is calculated by accumulating a NOx trap amount of the catalyst per unit time.

If the SOx cumulative amount reaches a predetermined amount, the controller 6 performs desulphating. Here, desulphating is a general term for three kinds of control, i.e., making the air-fuel ratio of the air-fuel mixture burnt in the engine 1 richer by controlling the fuel injection amount of the fuel injector 3, delaying the ignition timing of the spark plug 4, and stopping EGR by controlling the EGR valve 4. The enrichment of the air-fuel ratio promotes reduction of SOx released from the NOx trapping catalyst. The delay of ignition timing and stopping of EGR bring about a rise of exhaust temperature required to make the NOx trapping catalyst release SOx.

The controller 6 calculates the SOx cumulative amount of the NOx trapping catalyst as follows during desulphating. The SOx release amount per unit time released by desulphating is calculated, and the SOx cumulative amount per unit time is calculated by deducting the SOx release amount per unit time from the SOx trap amount per unit time. As the SOx release amount per unit time exceeds the SOx trap amount per unit time during desulphating, the SOx cumulative amount per unit time is a negative value that makes the SOx cumulative amount decrease. The controller 6 terminates desulphating when the SOx cumulative amount becomes zero. The SOx release amount per unit time in this calculation process, i.e., the SOx release rate, is not fixed.

Figure 3:
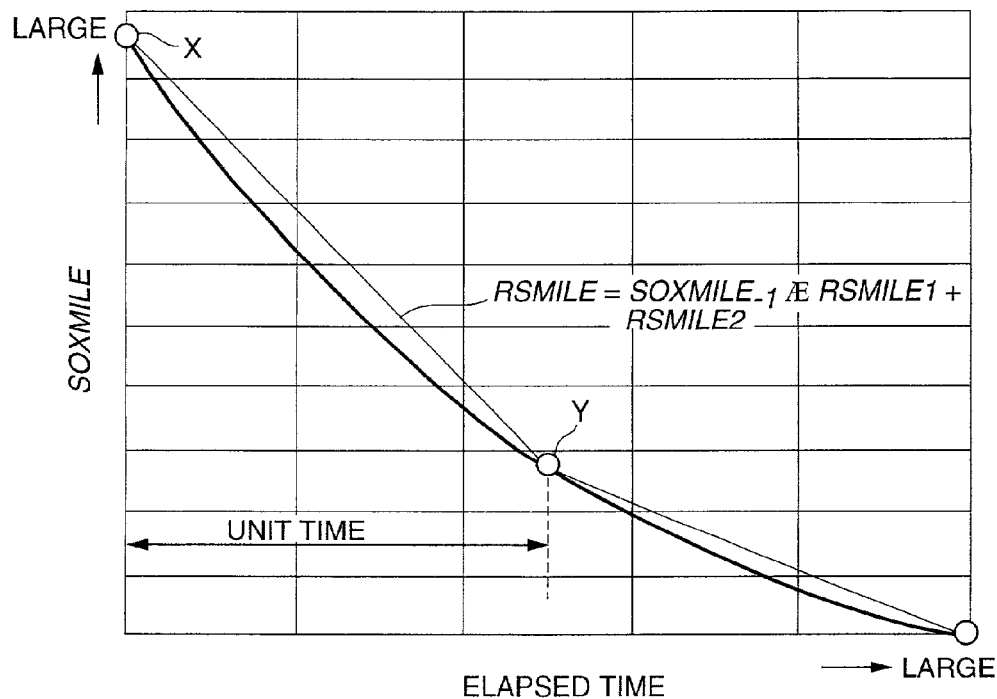
FIG. 3 is a diagram showing a relation between the duration of SOx desulphating and a SOx cumulative amount found experimentally by the inventors.

Referring to FIG. 3, according to the research of the inventors, the variation in the SOx cumulative amount with respect to the length of the SOx desulphating operation can be represented by a curve as shown in the drawing. This curve is obtained at a constant vehicle speed at which the SOx trapping rate of the NOx trapping catalyst is constant. The slope of the curve in this drawing is therefore considered to represent the SOx release rate. The curve shows that the SOx release rate is larger, the larger the SOx cumulative amount becomes, and the SOx release rate is large in the early stages of the SOx desulphating operation. Unless the calculation of the variation in the SOx cumulative amount is performed correctly, the completion of desulphating cannot be determined correctly. Consequently, if desulphating is terminated before desulphating is completed, the NOx trapping performance of the NOx trapping catalyst will not fully recover. On the other hand, if desulphating is continued even after desulphating is completed, the fuel consumption of the engine 1 will increase.

The controller 6 calculates a SOx release amount per unit time RSMILE, i.e., a SOx release rate, using equation (1), considering the characteristics of the SOx release rate as mentioned above.

$$RSMILE = SOXMILE_{-1} \cdot RSMILE1 + RSMILE2 \qquad (1)$$

where, $SOXMILE_{-1}$ = the SOx cumulative amount SOXMILE one unit time ago, and RSMILE1, RSMILE2 = coefficients.

The coefficients RSMILE1, RSMILE2 are set experimentally beforehand. The SOx release rate RSMILE is equal to the slope of the curve of the variation in the SOx cumulative amount shown in FIG. 3. Equation (1) calculates the SOX release rate RSMILE at the point X in FIG. 3, by calculating the slope of the straight line connecting the points X and Y separated by the unit time. As shown in FIG. 3, the SOx release rate is larger, the larger the SOX cumulative amount SOXMILE becomes.

Figure 4:
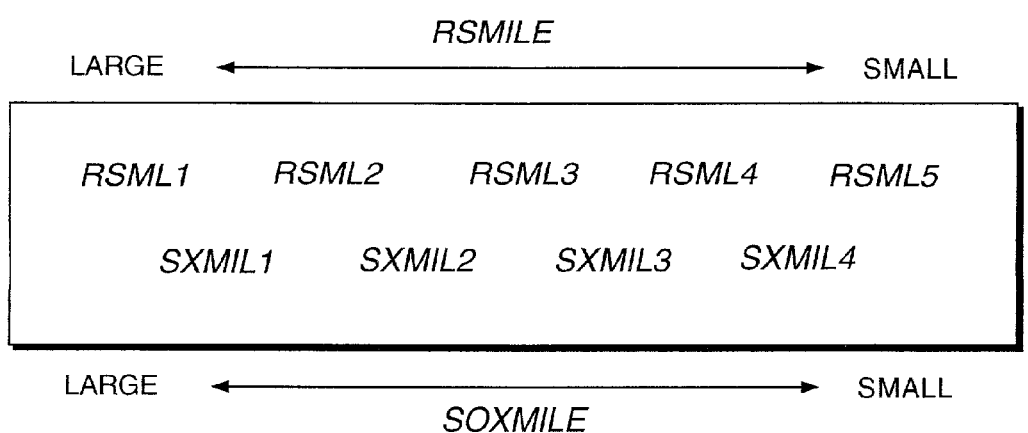
FIG. 4 is a diagram describing the characteristics of a desulphating constant table stored by the controller.

If the coefficients RSMILE1 and RSMILE2 are defined, it is possible to summarize a table showing the relation between the SOx cumulative amount SOXMILE and the SOx release rate RSMILE in FIG. 4. In this table, the SOx cumulative amount is divided into five regions by four boundary values, SXMIL1–SXMIL4, and the SOx release rate RSMILE is set as five fixed values, RSML1–RSML5, according to the region.

Here, SXMIL1>SXMIL2>SXMIL3>SXMIL4>SXMIL5, and RSML1>RSML2>RSML3>RSML4>RSML5.

That is, the SOx release rate RSMILE is larger the SOx cumulative amount SOXMILE becomes. This table or a map specifying the same characteristics is stored beforehand in the memory of the controller 6, and the controller 6 can also obtain the SOx decreasing rate RSMILE from the SOx cumulative amount SOXMILE by looking up the prestored table or map.

Now, if the exhaust temperature exceeds 650° C. even when desulphating is not performed, the NOx trapping catalyst will release trapped SOx. Therefore, if this temperature condition holds, the controller 6 calculates the SOx cumulative amount considering the variation characteristics of the SOx cumulative amount in the same way as when desulphating is performed, even if desulphating is not performed.

Next, the desulphating routine performed for the above control by the controller 6 will be described, referring to FIG. 2. This routine is performed at an interval of ten milliseconds during the running of the engine.

The controller 6 reads the vehicle speed V detected by the vehicle speed sensor 20 in a step S1.

In a following step S2, the SOX cumulative amount SOXMILE$_{-1}$ calculated on the immediately occasion when the routine was performed, is compared with an upper limiting value SOXFUL. The upper limiting value SOXFUL is a value for determining whether desulphating of the NOx trapping catalyst is performed, and is set as a value equivalent to ten percent of the physical upper limiting value of the SOx trap or poisoning of the NOx trapping catalyst.

The SOx cumulative amount SOXMILE in this routine while desulphating is not performed is converted into and expressed in mileage of vehicle travel. Correspondingly, the upper limiting value SOXFUL is expressed in mileage. Therefore, if the physical upper limiting value of the SOx cumulative amount of the NOx trapping catalyst is 8000 km, the upper limiting value SOXFUL is 800 km.

Now, in the step S2, if the SOX cumulative amount SOXMILE$_{-1}$ calculated on the immediately occasion when the routine was performed does not exceed the upper limiting value SOXFUL, the controller 6 determines whether or not the desulphating flag FLS1 is unity in a step S4. The desulphating flag FLS1 is a flag which is set to unity when the SOX poisoning-amount SOXMILE$_{-1}$ calculated on the immediately occasion when the routine was performed exceeds the upper limiting value SOXFUL, and it is reset to zero when desulphating is completed. Therefore, when the desulphating flag FLS1 is zero, it shows that the desulphating operation is not required. When the desulphating flag FLS1 is unity, it shows that the desulphating operation is required.

When the desulphating flag FLS1 is unity in the step S4, the controller 6 processes a step S5. When the desulphating flag FLS1 is not unity, i.e., in the case of zero, the controller 6 determines whether or not the vehicle speed V has reached the predetermined speed VSP2 in a step S8.

As mentioned above, the NOx trapping catalyst releases SOx when the exhaust gas is at a high temperature of 650° C. or more even if desulphating is not performed. As the exhaust gas temperature is higher the faster the vehicle runs, according to this routine, it is determined whether or not the exhaust gas temperature exceeds 650° C. by determining whether or not the vehicle speed V exceeds the predetermined speed VSP2. The predetermined speed VSP2 is therefore a vehicle speed corresponding to the exhaust temperature of 650° C., for example, 110–120 km/hr. Here, the predetermined speed VSP2 is set to 110 km/hr. The predetermined speed VSP2 is preferably determined experimentally beforehand.

If the vehicle speed V does not exceed the predetermined speed VSP2 in the step S8, the NOx trapping catalyst does not release SOx. In this case, the controller 6 performs the processing of a step S12 after setting the SOx release rate RSMILE to zero in a step S9. When the vehicle speed V exceeds the predetermined speed VSP2 in the step S8, the NOx trapping catalyst releases SOx. In this case, the controller 6 processes the step S11.

Now, in the step S2, when the SOX cumulative amount SOXMILE$_{-1}$ exceeds the upper limiting value SOXFUL, desulphating is required. In this case, in the step S3, the controller 6 sets the desulphating operation flag FLS1 to unity.

In a following step S5, it is determined whether or not the vehicle speed V has reached the predetermined speed VSP1. The predetermined velocity VSP1 is a value for determining whether or not the minimum exhaust temperature required to release SOx is obtained by performing desulphating of the NOx trapping catalyst. As mentioned above, from the relation between exhaust gas temperature and vehicle speed V, if the vehicle speed has reached the predetermined speed VSP1, it is determined that the NOx trapping catalyst can release SOx by desulphating. On the other hand, if the vehicle speed V has not reached the predetermined speed VSP1, it is determined that the NOx trapping catalyst does not release SOx even if desulphating is performed.

Here, the predetermined speed VSP1 is determined as follows.

That is, it is determined taking consideration of whether the temperature of the NOx trapping catalyst reaches the SOx release temperature of 650° C. by performing desulphating. In other words, the vehicle speed equivalent to a temperature obtained by deducting a temperature rise part due to desulphating from 650° C., is VSP1. Although the temperature rise due to desulphating changes with the specification of the exhaust purification device or engine, it is considered to be from 70° C. to 100° C. As a result, if the exhaust temperature is 550° C. to 580° C., the exhaust gas temperature will reach 650° C. by desulphating. The vehicle speed equivalent to the exhaust gas temperature of 550° C.–580° C. is, for example, 90–100 km/hr. Here, the predetermined vehicle speed VSP1 is set to 90 km/hr. It is desirable to set the predetermined vehicle speed VSP1 by determining it experimentally beforehand.

Now, in the step S5, if the vehicle speed V has reached the predetermined speed VSP1, the controller 6 will perform desulphating in the step S10. Desulphating means three operations, i.e. enrichment of the air-fuel ratio of the air-fuel mixture by increasing the fuel injection amount of the fuel injector 3, delay of ignition timing of the spark plug 4, and closing of the EGR valve 4 as mentioned above.

These operations are performed by signals output from the controller 6 to the fuel injector 3, spark plug 4 and EGR valve 14.

As seen from the flowcharts, desulphating is performed in the step S10 if it is determined that the SOx cumulative amount SOXMILE$_{-1}$ exceeds the upper limiting value SOX-FUL in the step S2, or desulphating is continuing in the step S4, in addition to the condition that the exhaust gas temperature represented by the vehicle speed V is in a region suitable for desulphating.

After desulphating, in a step S11, the controller 6 calculates the SOx release rate RSMILE using the above-mentioned equation (1).

As the NOx trapping catalyst releases SOx when the vehicle speed V exceeds the predetermined speed VSP2 in the step S8, even if desulphating is not performed, the SOx release rate RSMILE is calculated in the step S11 also in that case. The controller 6 processes the step S12 after the processing of the step S11.

On the other hand, if the vehicle speed V has not reached the predetermined speed VSP1 in the step S5, the controller 6 sets the SOx release rate RSMILE to zero in the step S6.

In the following step S7, the controller 6 stops desulphating by a signal output to the fuel injector 3, spark plug 4 and EGR valve 14. The controller 6 processes the step S12 after the processing of the step S7.

In the step S12, the controller 6 calculates a SOx trap amount ΔV per unit'time. The SOx amount trapped by the NOx trapping catalyst has an intimate relation with the mileage of the vehicle. The mileage is obtained by integrating the vehicle speed V. Here, the cumulative amount SOx ΔV per unit time corresponding to the execution interval of the routine, is calculated as a difference of an integral Vx of the vehicle speed V, and an integral Vx$_{-1}$ on the immediately preceding occasion when the routine was performed. In other words, the SOx trap amount ΔV per unit time is represented by the mileage achieved per unit time.

In the following step S13, the controller 6 calculates the SOx cumulative amount SOXMILE by the next equation (2) using the SOx release rate RSMILE which were set in the steps S6, S9 or S11, and the SOx trap amount ΔV per unit time.

$$SOXMILE = SOXMILE_{-1} + \Delta V - RSMILE \quad (2)$$

where, SOXMILE$_{-1}$=SOXMILE calculated on the immediately preceding occasion the routine was executed.

In the following step S14, it is determined whether the SOx cumulative amount SOXMILE is zero. This is a step which determines whether or not SOx desulphating was completed. When the SOX cumulative amount SOXMILE is zero, the controller 6 resets the desulphating flag FLS1 to zero in a step S15.

In a following step S16, the controller 6 stops desulphating as in the processing of the step S7 by signals output to the fuel injector 3, spark plug 4 and the EGR valve 14. The engine 1 is therefore run at an air-fuel ratio, ignition timing and exhaust gas recirculation amount which are usually applied to normal running. The controller 6 processes the step S17 after the processing of the step S16.

In the step S14, when the SOx cumulative amount SOXMILE is not zero, steps S15 and S16 are skipped and the step S17 is processed.

In the step S17, after storing the mileage Vx and the SOx cumulative amount SOXMILE in a memory as Vx$_{-1}$, SOXMILE$_{-1}$, respectively, the controller 6 terminates the routine.

In the step S14, it is determined whether or not desulphating is complete by determining whether or not the SOX cumulative amount SOXMILE is zero, but whether or not desulphating is complete can also be determined by setting a minimum valve of the SOx cumulative amount at which the NOx trapping catalyst effectively completes SOx release, and comparing this minimum value with the SOx cumulative amount SOXMILE.

Next, the variation of the SOx cumulative amount SOXMILE of the NOx trapping catalyst in the aforesaid routine will be described referring to FIGS. 5A–5D.

The SOx cumulative amount SOXMILE of the NOx trapping catalyst increases with the vehicle running distance. If the vehicle speed V exceeds the predetermined speed VSP2 during a run as shown in section A of FIG. 5B, the NOx catalyst temperature will rise above 650° C., and the NOx trapping catalyst will release SOx. Consequently, as shown in FIG. 5A, the SOx cumulative amount SOXMILE decreases.

Figures 5A, 5B, 5C, 5D:
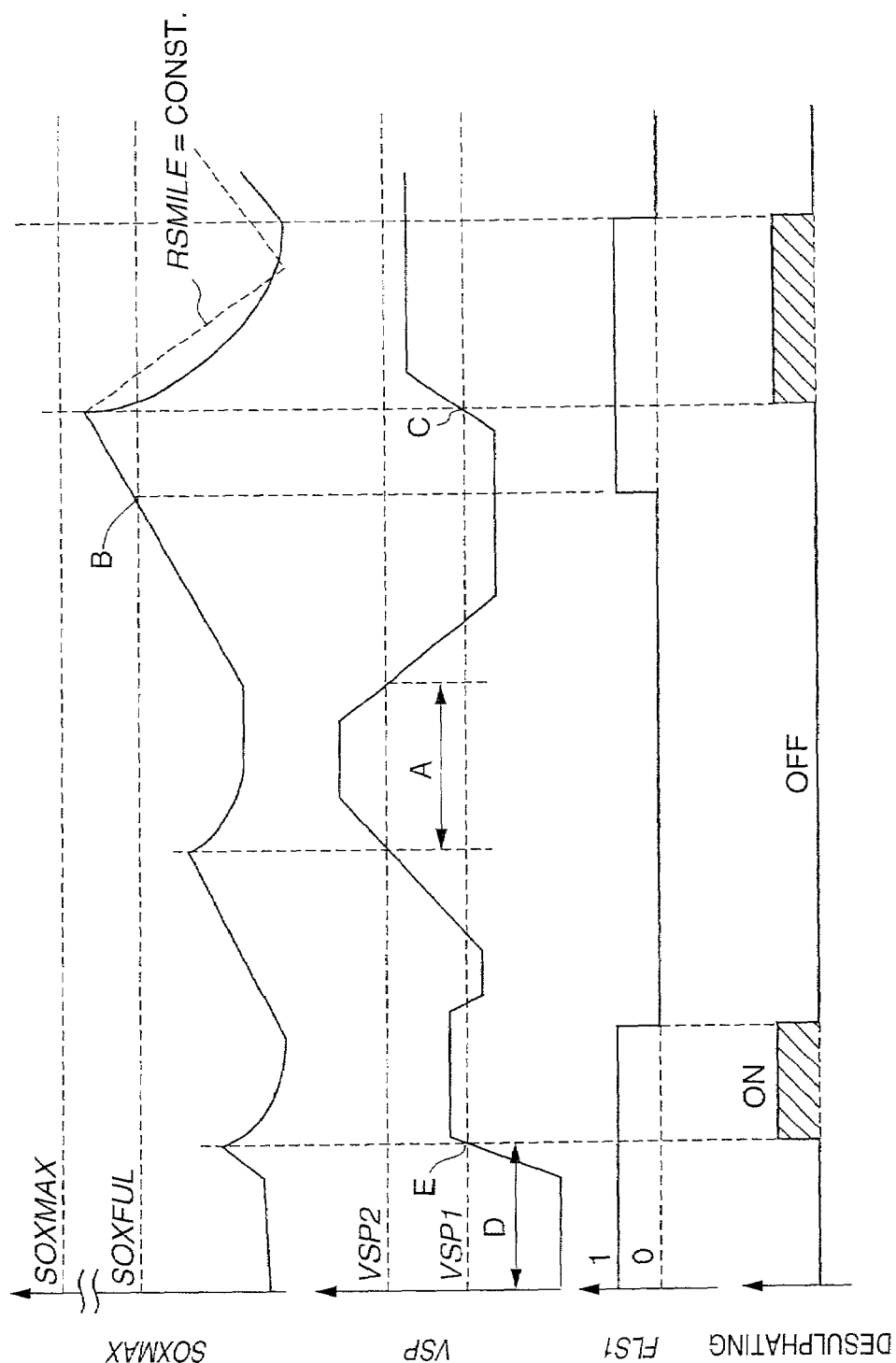
FIGS. 5A–5D are timing charts describing the desulphating operation performed by the controller.

If the section in which the vehicle speed V does not exceed the predetermined vehicle speed VSP2 continues for some time, the SOx cumulative amount SOXMILE of the NOx trapping catalyst continues to increase, and eventually exceeds the upper limiting value SOXFUL shown by the point B of FIG. 5A. Consequently, the desulphating flag FLS1 changes from zero to unity as shown in FIG. 5C. However, if the vehicle speed V at this time does not exceed the predetermined speed VSP1, the controller 6 does not perform desulphating.

When the desulphating flag FLS1 is unity, and the vehicle speed V exceeds the predetermined velocity VSP1 as shown by the point C of FIG. 5B, the controller 6 performs desulphating as shown by FIG. 5D, and release of SOx from the NOx trapping catalyst is promoted due to enrichment of the air fuel ratio and rise in temperature of the exhaust gas. As a result, the SOx cumulative amount SOXMILE decreases and eventually becomes zero as shown by the point F in FIG. 5A. When the SOx cumulative amount SOXMILE becomes zero, the controller 6 stops desulphating as shown by FIG. 5D.

As can be seen from FIG. 5A, the decrease of the SOx cumulative amount SOXMILE of the NOx trapping catalyst is not linear, but the decrease rate increases the larger the SOX poisoning amount SOXMILE becomes, and in the latter half of SOx release, the decrease rate of the SOx cumulative amount SOXMILE gradually becomes smaller. In this case, if it was assumed that the SOx release rate RSMILE is a fixed value, and the SOx cumulative amount SOXMILE is calculated based on the constant release rate, the timing when the SOx desulphating procedure is completed will be largely different from the timing when the SOx desulphating procedure is actually completed.

Figure 2:
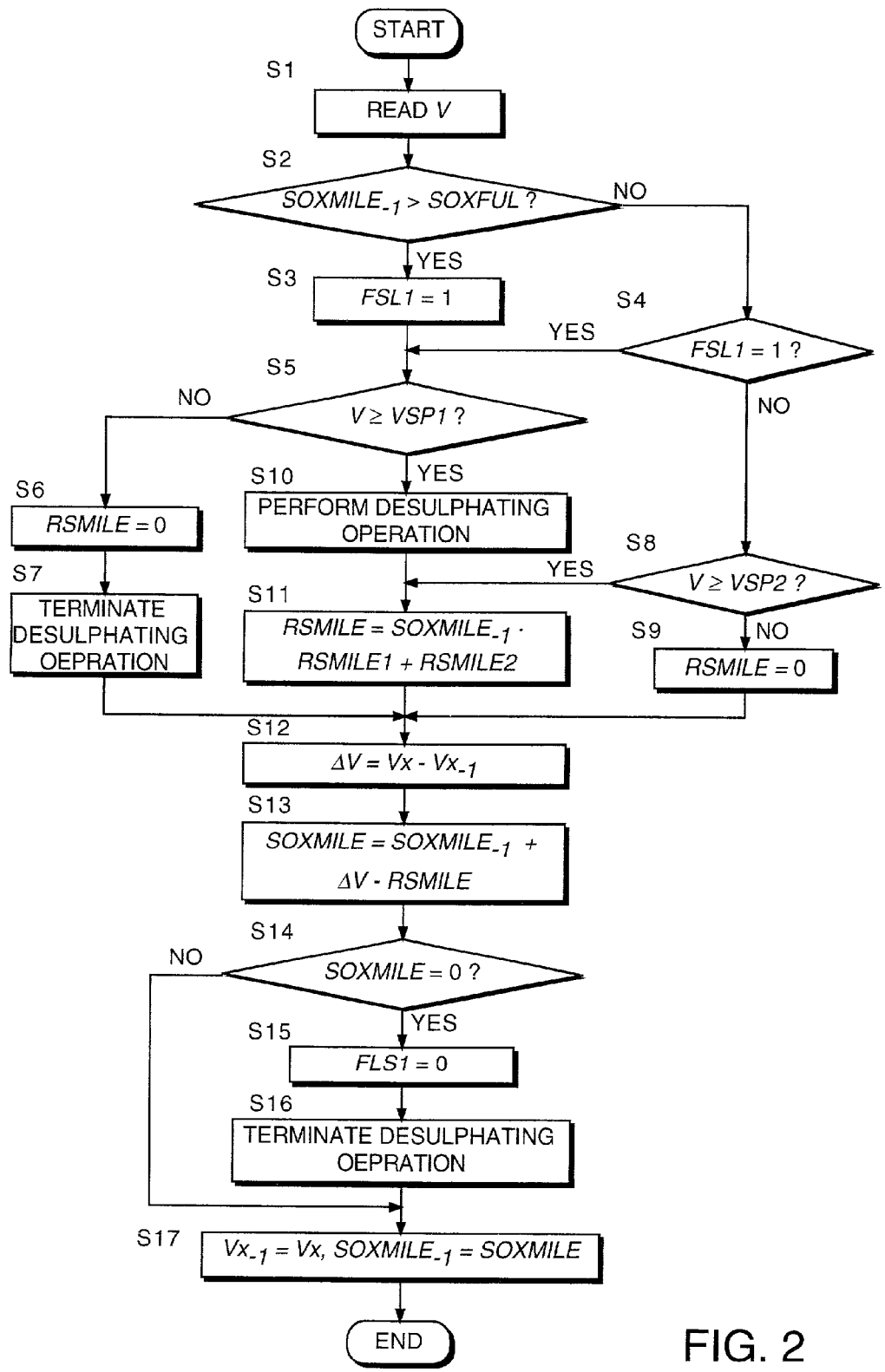
FIG. 2 is a flowchart describing a desulphating routine of a NOx trapping catalyst performed by a controller according to this invention.

In this exhaust gas purification device, as shown by the step S11 of the routine of FIG. 2, the controller 6 calculates the SOx release amount RSMILE using a coefficient RSMILE1 set according to the elapsed time from the start of desulphating, and a coefficient RSMILE2 set based on the SOx cumulative amount SOXMILE. The SOx cumulative amount SOXMILE can therefore precisely trace the actual variation in the SOx cumulative amount of the NOx trapping catalyst.

Therefore, desulphating is performed not too much and not too little, and release of SOx can be completed in a short time without wastage. The increase of fuel consumption due to desulphating can also be suppressed to the lowest limit. Further, the fact that completion of SOx release can be precisely known has a desirable effect on the determining precision of desulphating on the next occasion.

On the other hand, even during the desulphating period when the desulphating flag FLS1 is unity, when the vehicle speed V is less than the predetermined vehicle speed VSP1, as the exhaust gas temperature is too low, the NOx trapping catalyst cannot release SOx even if desulphating is performed. In this case, desulphating is prevented from being performed in the step S7 of the routine of FIG. 2, so an increase in the fuel consumption which does not contribute to promote SOx release is also prevented. The region D in FIG. 5B corresponds to this state. Thus, if desulphating is interrupted due to the lowering of the vehicle speed V, a desulphating flag FLS1 can be held at unity as shown in FIG. 5C. Desulphating is then performed when the vehicle speed V reaches the predetermined vehicle speed VSP1 at a point E in FIG. 5B. While the desulphating is being interrupted, the SOx release rate RSMILE is set to zero in the step S6, so the calculation precision of the SOx cumulative amount SOXMILE is not impaired while desulphating is interrupted.

Figure 6:
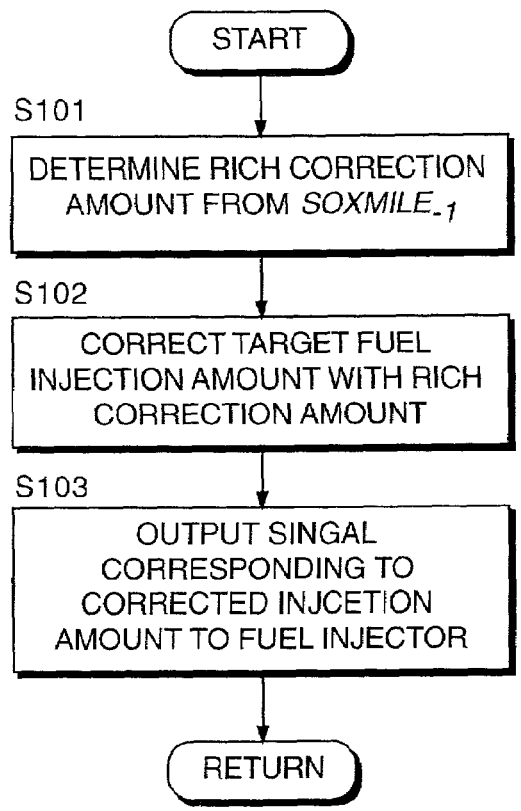
FIG. 6 is a flowchart describing an air-fuel ratio control subroutine performed by the controller according to a second embodiment of this invention.

Next a second embodiment of this invention will be described referring to FIGS. 6, 7.

This embodiment relates to desulphating performed by the controller 6 in the step S10 of FIG. 2. In this embodiment, when the controller 6 performs desulphating, the richness of the air-fuel ratio of the air-fuel mixture burnt by the engine 1 is varied according to the SOx cumulative amount SOXMILE by performing the subroutine shown in FIG. 6.

Figure 7:
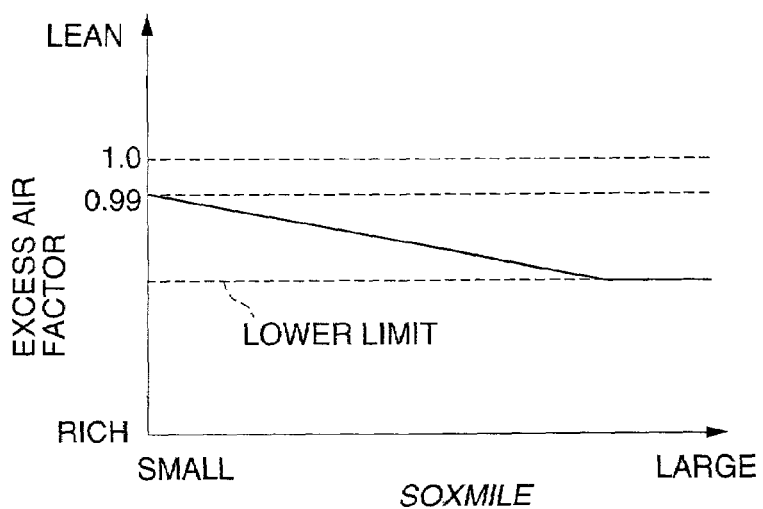
FIG. 7 is a diagram describing the characteristics of a map of an excess air factor stored by the controller according to the second embodiment of this invention.

Specifically, first in a step S101, the controller 6 calculates a rich correction amount of an excess air factor by looking up a map having the characteristics shown in FIG. 7 which is prestored in the memory of the controller 6, based on the SOx cumulative amount $SOXMILE_{-1}$.

Here, the excess air factor is a value obtained by dividing the air-fuel ratio by the stoichiometric air-fuel ratio, where unity denotes the stoichiometric air-fuel ratio, a value larger than unity denotes a lean air-fuel ratio and a value less than unity denotes a rich air-fuel ratio.

The map shown in FIG. 7 has characteristics such that the excess air factor approaches unity, the smaller the SOx cumulative amount SOXMILE during desulphating becomes. In this map, the excess air factor during desulphating is set to 0.99, and the excess air factor decreases as the SOx cumulative amount SOXMILE increases. In other words, the richness of the air-fuel ratio increases. The controller 6 determines a target excess air factor from this map, and calculates a correction amount of the fuel injection amount corresponding to the difference between the excess air factor for desulphating and the target excess air factor for the state where desulphating is not performed.

In a next step 102, the target fuel injection amount is corrected by the correction amount.

In a next step S103, the controller 6 outputs a signal corresponding to the corrected target fuel injection amount to the fuel injector 3, and terminates the routine.

In this way, regarding the desulphating of the step S10, varying the richness of the air-fuel of the air-fuel mixture which is burnt by the engine 1 according to the SOx cumulative amount SOXMILE is desirable from the viewpoint of suppressing increase of fuel consumption accompanying the desulphating process.

When the SOx cumulative amount SOXMILE is near zero, as seen from FIG. 3, the SOx release rate RSMILE is small, and RSMILE does not increase even if the air-fuel ratio is enriched. In this embodiment, in this case, a rich air-fuel ratio near the stoichiometric air-fuel ratio is applied, so ineffective fuel consumption can be prevented.

The contents of Tokugan 2001-174365, with a filing date of Jun. 8, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, as a variation of the air-fuel ratio control, instead of setting a target air-fuel ratio according to the SOx cumulative amount SOXMILE, a target air-fuel ratio can also be set according to the elapsed time from the start of desulphating. In this case, the rich air-fuel ratio is made to approach the stoichiometric air-fuel ratio as the elapsed time increases. Also, after desulphating is interrupted due to a decrease of the vehicle speed, the desulphating may be resumed in a state where the SOx cumulative amount SOXMILE is less than the upper limiting value SOXFUL. In this case, to perform appropriate air-fuel ratio control, the target air-fuel ratio when desulphating starts may be set according to the SOx cumulative amount SOXMILE. In the above description, the SOx cumulative amount SOXMILE corresponds to the sulphur oxide poisoning amount, and the decrease rate of SOx cumulative amount SOXMILE, i.e., $\Delta V$–RSMILE, corresponds to the decrease amount per unit time of the sulphur oxide poisoning amount.

The embodiments of this invention in which an exclusive property or privilege is claimed are defined as follows:

What is claimed is:

1. An exhaust gas purification device for a vehicle engine comprising:
   a nitrogen oxide trapping catalyst which traps nitrogen oxides in exhaust gas, the engine comprising a mechanism which removes sulphur oxides which have poisoned the nitrogen oxide trapping catalyst from the nitrogen oxide trapping catalyst;
   a sensor which detects a running condition of the vehicle; and
   a programmable controller programmed to:
      calculate a sulphur oxide poisoning amount of the nitrogen oxide trapping catalyst from the running condition of the vehicle;
      start operation of the mechanism when the sulphur oxide poisoning amount reaches a predetermined amount;
      set a decrease amount per unit time of the sulphur oxide poisoning amount during operation of the mechanism as a parameter based on the sulphur oxide poisoning amount;
      calculate the sulphur oxide poisoning amount during operation of the mechanism based on an integral value of the decrease amount per unit time;
      after operation of the mechanism has started, stop operation of the mechanism when the sulphur oxide poisoning amount has decreased to a predetermined desulphating completion equivalent value;
      wherein the controller is further programmed to set the decrease amount per unit time of the sulphur oxide poisoning amount during operation of the mechanism by the following equation (A):

$RSMILE = SOXMILE_{-1} \cdot RSMILE1 + RSMILE2$ where
      RSMILE=the decrease amount per unit time,
      $SOXMILE_{-1}$=the sulphur oxide poisoning amount SOXMILE one unit time ago,
      RSMILE1=a coefficient which becomes smaller as an elapsed time from start-up of the mechanism increases, and RSMILE2=a coefficient which becomes larger as the SOXMILE$_{-1}$ becomes larger.

2. The exhaust gas purification device as defined in claim 1, wherein the running condition detecting sensor comprises a sensor which detects a running speed of the vehicle, and the controller is further programmed to calculate the sulphur oxide poisoning amount based on the integral value of the running speed.

3. The exhaust gas purification device as defined in claim 1, wherein the exhaust gas purification device further comprises a sensor which detects a temperature of the exhaust gas, and the controller is further programmed not to start operation of the mechanism when the temperature of the exhaust gas is less than a predetermined temperature.

4. The exhaust gas purification device as defined in claim 3, wherein the controller is further programmed to stop operation of the mechanism, when the temperature of the exhaust gas is less than the predetermined temperature after the mechanism has started.

5. The exhaust gas purification device as defined in claim 3, wherein the temperature sensor comprises a sensor which detects a running speed of the vehicle.

6. The exhaust gas purification device as defined in claim 3, wherein the controller is further programmed to set, when the exhaust gas temperature exceeds a second predetermined temperature higher than the predetermined temperature while the mechanism is operating, the decrease amount per unit time of the sulphur oxide poisoning amount as a parameter based on the sulphur oxide poisoning amount, and the sulphur oxide poisoning amount is calculated based on the integral value of the decrease amount per unit time.

7. The exhaust gas purification device as defined in claim 1, wherein the mechanism comprises a fuel injector which injects fuel, a spark plug which ignites the fuel and an exhaust gas recirculation valve which recirculates part of the exhaust gas of the engine into an intake air of the engine, and wherein the mechanism removes sulphur oxides from the nitrogen trapping catalyst by enriching an air-fuel ratio of the intake air and the fuel by increasing the fuel injection amount of the fuel injector, and by raising the exhaust gas temperature by delaying the ignition timing of the spark plug and closing the exhaust gas recirculation valve.

8. The exhaust gas purification device as defined in claim 7, wherein the controller is further programmed to vary a richness of the air-fuel ratio based on the sulphur oxide poisoning amount during operation of the mechanism.

9. The exhaust gas purification device as defined in claim 8, wherein the controller is further programmed to decrease the richness of the air-fuel ratio as the sulphur oxide poisoning amount decreases during operation of the mechanism.

10. An exhaust gas purification system comprising a controller according to claim 1.

11. A motor vehicle comprising an exhaust gas purification system according to claim 10.

12. An exhaust gas purification device for a vehicle engine comprising:
  a nitrogen oxide trapping catalyst which traps nitrogen oxides in exhaust gas, the engine comprising means for removing sulphur oxides which have poisoned the nitrogen oxide trapping catalyst from the nitrogen oxide trapping catalyst;
  means for detecting a running condition of the vehicle;
  means for calculating a sulphur oxide poisoning amount of the nitrogen oxide trapping catalyst from the running condition of the vehicle;
  means for starting operation of the removing means when the sulphur oxide poisoning amount reaches a predetermined amount;
  means for setting a decrease amount per unit time of the sulphur oxide poisoning amount during operation of the removing means as a parameter based on the sulphur oxide poisoning amount;
  means for calculating the sulphur oxide poisoning amount during operation of the removing means based on an integral value of the decrease amount per unit time; and
  means for stopping, after operation of the removing mechanism has started, operation of the removing means when the sulphur oxide poisoning amount has decreased to a predetermined desulphating completion equivalent value;
  wherein the setting means sets the decrease amount per unit time of the sulphur oxide poisoning amount during operation of the mechanism by the following equation (A):

$$RSMILE = SOXMILE_{-1} \cdot RSMILE1 + RSMILE2$$

where
    RSMILE=the decrease amount per unit time,
    SOXMILE$_{-1}$=the sulphur oxide poisoning amount SOXMILE one unit time ago,
    RSMILE1=a coefficient which becomes smaller as an elapsed time from start-up of the mechanism increases, and
    RSMILE2=a coefficient which becomes larger as the SOXMILE$_{-1}$ becomes larger.

13. An exhaust gas purification method for a vehicle engine, the engine comprising a nitrogen oxide trapping catalyst which traps nitrogen oxides in exhaust gas, means for removing sulphur oxides which have poisoned the nitrogen oxide trapping catalyst from the nitrogen oxide trapping catalyst, the method comprising:
  detecting a running condition of the vehicle;
  calculating a sulphur oxide poisoning amount of the nitrogen oxide trapping catalyst from the running condition of the vehicle;
  starting operation of the removing means when the sulphur oxide poisoning amount reaches a predetermined amount;
  setting a decrease amount per unit time of the sulphur oxide poisoning amount during operation of the removing means as a parameter based on the sulphur oxide poisoning amount;
  calculating the sulphur oxide poisoning amount during operation of the removing means based on an integral value of the decrease amount per unit time; and
  stopping, after operation of the removing mechanism has started, operation of the removing means when the sulphur oxide poisoning amount has decreased to a predetermined desulphating completion equivalent value;
  wherein setting the decrease amount per unit time includes setting of the decrease amount per unit time of the sulphur oxide poisoning amount during operation of the mechanism by the following equation (A):

$$RSMILE = SOXMILE_{-1} \cdot RSMILE1 + RSMILE2$$

where
    RSMILE=the decrease amount per unit time,
    SOXMILE$_{-1}$=the sulphur oxide poisoning amount SOXMILE one unit time ago,
    RSMILE1=a coefficient which becomes smaller as an elapsed time from start-up of the mechanism increases, and
    RSMILE2=a coefficient which becomes larger as the SOXMILE$_{-1}$ becomes larger.

* * * * *